US005969296A

United States Patent [19]

Yamamoto et al.

[11] Patent Number: 5,969,296

[45] **Date of Patent: *Oct. 19, 1999**

[54] POSITION POINTING MECHANISM AND METHOD FOR POSITION DETECTING APPARATUS

[75] Inventors: Masayasu Yamamoto; Yasushi Sekizawa; Takenori Kaneda; Yuji Katsurahira, all of Saitama-ken, Japan

[73] Assignee: Wacom Co., Ltd., Saitama-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,160

[22] Filed: Feb. 25, 1997

[30] Foreign Application Priority Data

Oct. 31, 1996 [JP] Japan .................................... 8-305906

[51] Int. Cl.[6] .............................. G08C 21/00; G09G 5/00

[52] U.S. Cl. .................................... 178/18.01; 178/18.03; 178/19.01; 178/19.03; 178/19.04; 345/179

[58] Field of Search .................................... 345/167, 173, 345/174, 179, 184; 348/734; 178/19.01, 19.03, 19.04, 18.01, 18.03, 19.05

[56] References Cited

U.S. PATENT DOCUMENTS

| | | | |
|---|---|---|---|
| 3,988,680 | 10/1976 | Kolm | 348/734 |
| 4,878,553 | 11/1989 | Yamanami et al. | 178/18 |
| 5,004,871 | 4/1991 | Purcell | 178/18 |
| 5,109,141 | 4/1992 | Purcell | 178/18 |
| 5,466,896 | 11/1995 | Murakami et al. | 178/19 |
| 5,563,631 | 10/1996 | Masunaga | 345/167 |
| 5,661,269 | 8/1997 | Fukuzaki | 345/179 |
| 5,714,984 | 2/1998 | Fukuzaki | 345/179 |

*Primary Examiner*—Vijay Shankar
*Attorney, Agent, or Firm*—Finnegan, Henderson, Farabow, Garrett & Dunner, L.L.P.

[57] ABSTRACT

A position pointing mechanism for use with a position detecting apparatus, including a pen shaped position pointing device manipulable with one hand of a person operating the mechanism, a rotatable dial having an exposed periphery moveable along the axis of the position pointing device and located on the pen shaped position pointing device so as to be operable with a finger of the one hand in which the position pointing device is held. Provision is made for detecting rotation of the dial, and for detecting relative pressure between the position pointing device and the position detecting apparatus.

11 Claims, 4 Drawing Sheets

WAVEFORM FIGURE AT EACH SEGMENT

POSITION POINTING MECHANISM AND METHOD FOR POSITION DETECTING APPARATUS

BACKGROUND OF THE INVENTION

1. Field of the Invention

The present invention relates to a pen-shaped position pointing device used in a position detecting apparatus.

2. Description of the Related Art

A position pointing device inputs two dimensional position information and pen pressure by tracing on a tablet. If other information is needed, then a tactile switch or the like is installed on the position pointing device.

The prior configuration, however, was not suitable to input information which requires more information than just two dimensional position and pen pressure information, e.g. three dimensional position information. In a drawing application if pen pressure controls line width, other characteristics such as hue or ink amount cannot be operated by a finger easily, compelling the user to click a function button on a screen with the pen tip.

SUMMARY OF THE INVENTION

To alleviate these problems of the prior art, the position pointing device of the present invention inputs three dimensional position information. In a drawing application, this invention provides an easy means to control hue or ink amount by rotating a dial.

The position pointing device of the invention includes a dial installed at an operable position on the pen when it is held, capable of rotating in a direction of the core axis; a means to detect the operation information of the dial and covert it to a predetermined output signal; and a pen pressure detecting means.

By this configuration, other information on top of the two dimensional position and pen pressure information can be easily controlled by fingers, and generated as a predetermined output signal.

The present invention also includes a method for inputting data to a computer using a position pointing device and a tablet. The method includes the steps of: contacting the position pointing device with the tablet; moving the position pointing device in contact with the tablet relative to the tablet to input a first set of data; measuring the relative pressure between the position pointing device and the tablet to input a second set of data; and rotating a dial on the position pointing device to input a third set of data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENT

Reference will now be made in detail to the present preferred embodiments of the invention, examples of which are illustrated in the accompanying drawings.

The present invention is embodied in a position pointing device and an associated graphics tablet. The position pointing device inputs information such as graphics or a drawing by tracing on the graphics tablet. Examples of position pointing devices and graphics tablets are disclosed in U.S. Pat. Nos. 4,878,553 and 5,466,896, the disclosures of which are hereby incorporated by reference.

Figure 1:
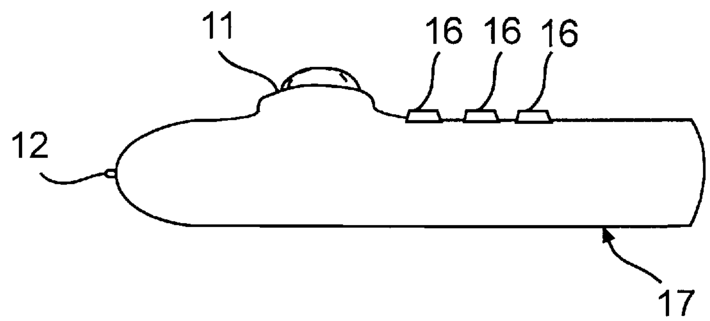
FIG. 1 is a side view illustration of a position pointing device in accordance with a first embodiment of the present invention.
Figure 2:
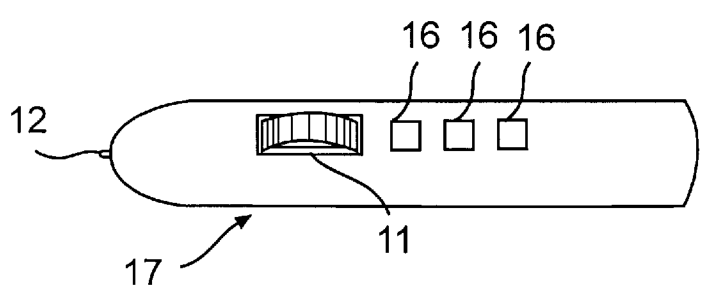
FIG. 2 is a side view of a position pointing device in accordance with a first embodiment of the present invention.
Figure 3:
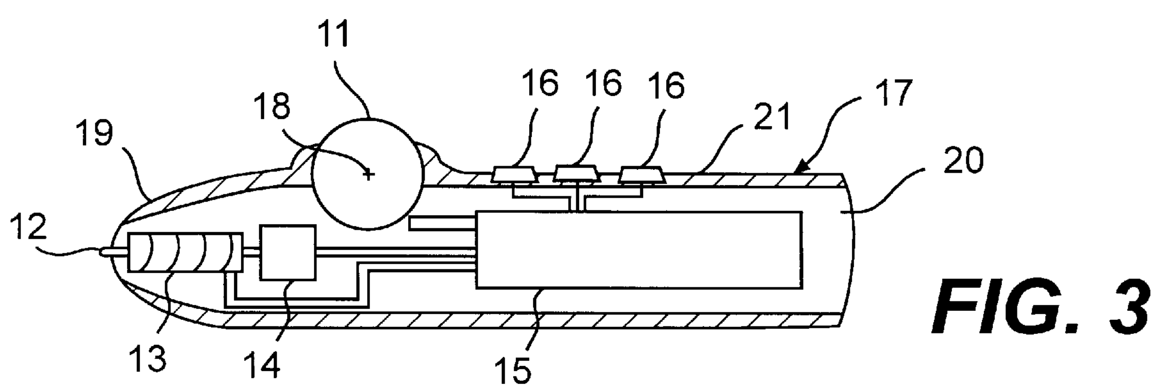
FIG. 3 is a sectional view of a position pointing device in accordance with a first embodiment of the present invention.
Figure 4:
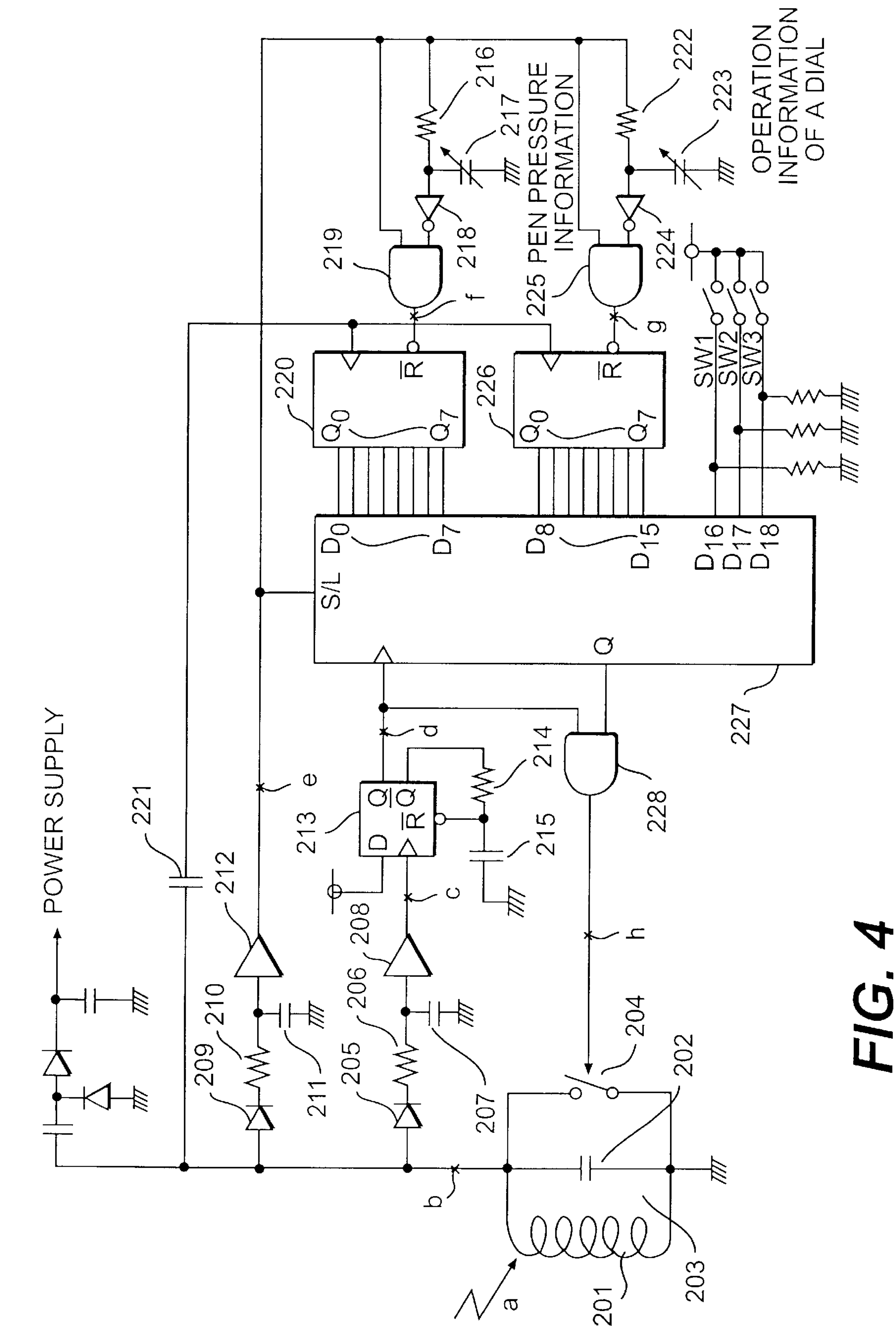
FIG. 4 is a schematic circuit diagram of the first embodiment.

FIGS. 1 through 3 are illustrations of a position pointing device 17 with a rotatable dial 11 in a first embodiment. The position pointing device is shown is of generally pen-shaped configuration of a cylindrical pen. The position pointing device has a forward end 19 and a rearward end 20. The dial 11 is rotatable about an axis 18 which is perpendicular to the longitudinal axis of the pen shaped position pointing device. In the embodiment shown in FIGS. 1 through 3, pen tip 12 is located at the forward end 19 of the pen shaped positioning device and projects from the forward end. The forward end of the pen shaped position pointing device generally tapers down towards the pen tip as shown in FIGS. 1 through 3. The pen shaped positioning device includes an oscillation coil 12, pen pressure detecting sensor 14, circuit segment 15 and tactile switch 16. The pen shaped pointing device has a housing 21 in which the oscillation coil, pen pressure sensor and circuit segment are located. The pen tip 12, dial 11, and tactile switches 16 project from the housing 21. FIG. 4 is a diagram of the circuit segment 15.

Now an operation shall be described for the first embodiment of the position pointing device with a rotatable dial.

FIGS. 1 through 3 show a rotatable dial 11 attached to a pen-shaped position pointing device. A degree of rotation of the dial is transmitted to a tablet as an 8 bit digital information. Pen pressure detecting sensor 14 detects the relative pressure between the pen tip 12 and the tablet. This pressure is referred to as pen pressure.

Figure 6:
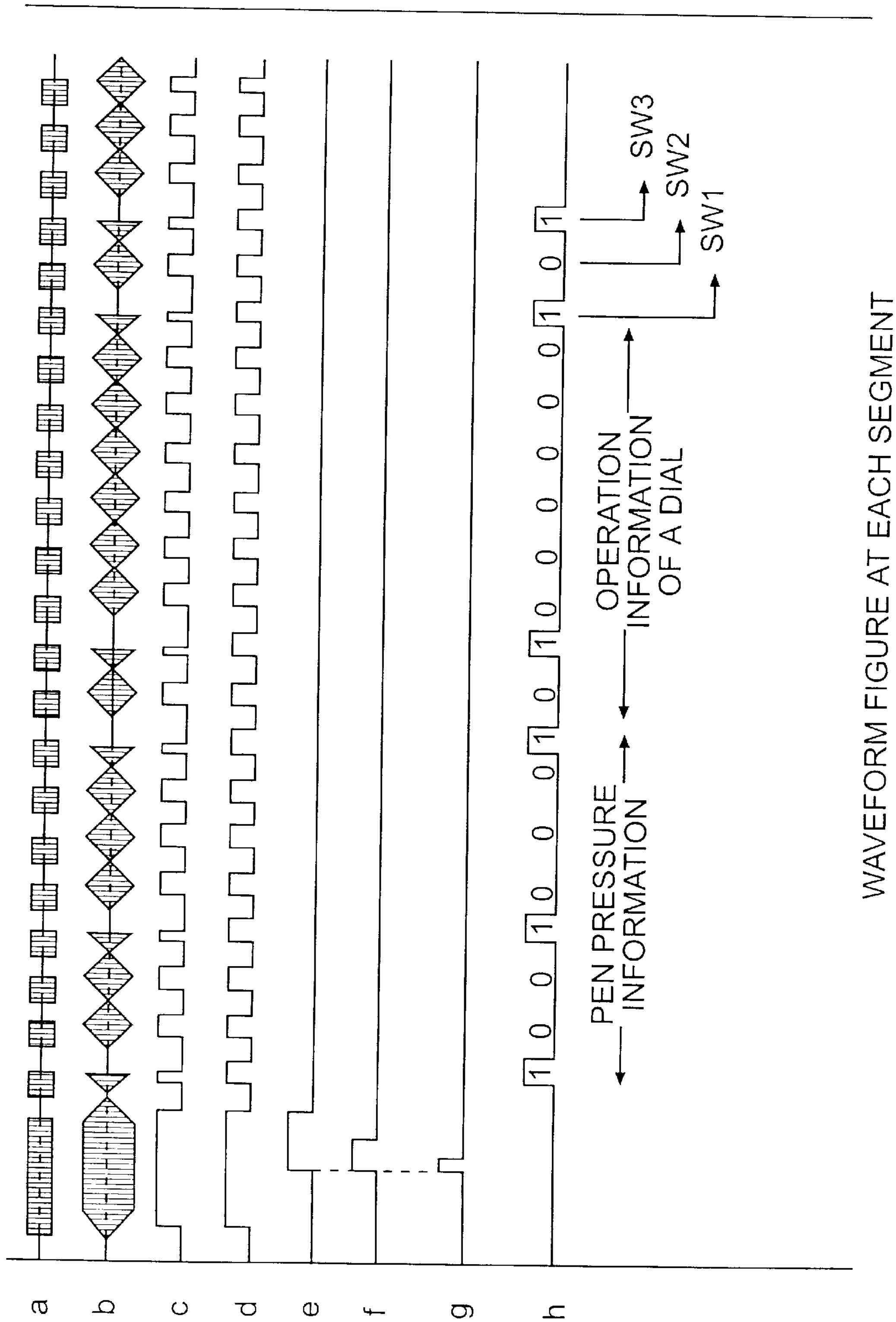
FIG. 6 is a waveform diagram at each segment of the schematic circuit diagram.

FIG. 4 is a schematic circuit diagram of the embodiment, wherein two kinds of analogue quantities, pen pressure and the rotation of dial 11 are converted to an 8 bit digital value respectively together with 3 bit tactile switch information. Thus, 19 bits of operation information are transmitted to the tablet. FIG. 6 illustrates a waveform at each segment of a~h in the circuit diagram. Using these figures, the operation will be further described.

In FIG. 4, a coil 201 and a capacitor 202 form a resonance circuit 203. The resonance circuit 203 resonates at a frequency of an electromagnetic wave from the tablet and generates an induced voltage b when it receives the electromagnetic wave a. A switch 204 is connected to the resonance circuit 203 and is configured to be able to control a resonant state in the resonance circuit by the resonance signal h.

A first detecting circuit comprising a diode 205, a capacitor 207, and a buffer amplifier 208 is also connected to the resonance circuit 203. In this detecting circuit, a time constant is set so that an integration circuit configured with a resistor 206 and a capacitor 207 generates an output signal c when an electromagnetic wave a is received continuously for a first predetermined duration (in this embodiment, sufficiently longer duration than 100$\mu$ sec) from the tablet.

A D flip-flop 213, a resistor 214, and a capacitor 215 form a monostable multi vibrator circuit. The monostable multi vibrator circuit, generates the signal d at a constant time interval from the start up time of the output signal c of the first detecting circuit.

Also, a second detecting circuit is connected to the resonance circuit 203. The second detecting circuit comprises a diode 209, a resistor 210, a capacitor 211, and a buffer amplifier 212. In the second detecting circuit, a time constant of an integration circuit configured with resistor 210 and a capacitor 211 is set to generate an output signal e when an electromagnetic wave a is received continuously for a second predetermined duration (in this embodiment, sufficiently longer duration than 700$\mu$ sec) from the tablet.

A resistor 216, a variable capacitor 217, an inverter amplifier 218, and an AND gate 219, obtain a signal f whose pulse width changes in accordance with pen pressure. The variable capacitor 217 detects pen pressure. A clock terminal of a counter 220 is connected to the resonance circuit 203 via a coupling capacitor 221. Signal f is connected to the counter 220. The counter 220 counts the number of high frequency waves generated in the resonance circuit 203 during the period of the pulse width of the signal f which changes in accordance with the pen pressure. The counter 220 then outputs digital values Q0~Q7.

It is also possible to detect pen pressure by making the resistor 216 variable.

A resistor 222, a variable capacitor 223, an inverter amplifier 224, and an AND gate 225 obtain a signal g whose pulse width changes in accordance with operation information of a rotatable dial set in the variable capacitor 223. A clock terminal of counter 226 is connected to the resonance circuit 203 via coupling capacitor 221. Signal g is connected to the counter 226. The counter 226 counts during the period of the pulse width of the signal f which changes in accordance with the dial operation information. The counter 226 then outputs digital values Q0~Q7.

It is also possible to detect the dial operation information by making the resistance 222 variable.

A parallel to serial conversion circuit 227 has an output signal d of the monostable multi vibrator circuit connected to its clock input terminal, and sequentially outputs 19 bit digital data at each start up timing of the signal d. The 19 bit digital data includes 8 bit digital data of pen pressure information outputted from the counter 220, 8 bit digital data of a dial operation information outputted from the counter 226, and 3 bit switch dial information of SW1~SW3. This output signal, by going through the AND gate 228, causes a signal h to be attained while the signal d is being generated. As the switch 204 is opened and closed in accordance with the signal h, the 19 bit digital data comprising 8 bit digital data of the pen pressure information, 8 bit data of the dial operation information, and 3 bit switch data of SW1~SW3 appears as a presence or absence of a reception signal on the table side. If the control signal h is "o" then a signal is detected on the tablet side. If the control signal h is "1" then a signal is not detected on the tablet side. Thus, the information in accordance with the operation of the position pointing device is detected on the tablet side.

It is also acceptable to make a rotatable dial to return to a predetermined position when it is released.

According to this embodiment, it is capable to generate additional information with an easy operation by a finger, as well as the two dimensional position and pen pressure.

Figure 5:
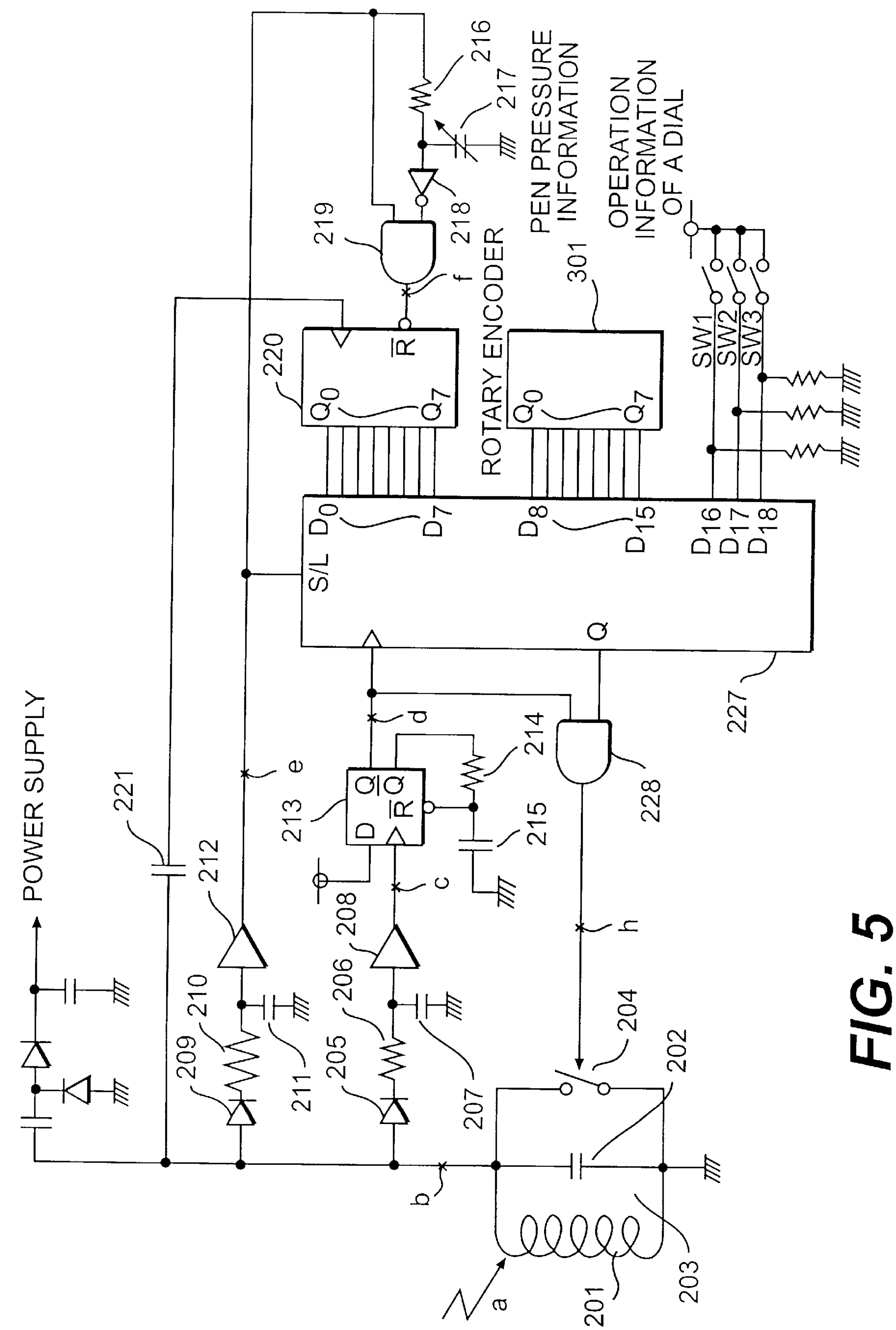
FIG. 5 is a schematic circuit diagram of a second embodiment.

FIG. 5 is a circuit diagram of a second embodiment in accordance with the invention. An absolute rotary encoder is employed to generate an 8 bit parallel signal in accordance with a degree of rotation of a rotatable dial, and the signal is converted to a predetermined serial signal by the paralleled to serial conversion circuit 227.

In the circuit segment of the first embodiment in FIG. 4, an analogue quantity is detected by the time constant circuit in which capacity or resistance changes by a rotation of the rotatable dial, but in the second embodiment, an absolute rotary encoder is employed in which an 8 bit serial signal is generated in accordance with the state of rotation of the rotatable dial, and converts the signal to the predetermined serial signal at the parallel to serial conversion circuit 227.

Thus, the present embodiment enables additional information to be generated with an easy operation by a finger on top of the previously known information on two dimensional position and pen pressure.

It is a contribution of the present invention enabling a position pointing device capable of generating an operation informing of a dial, e.g., a three dimensional position information, as an output signal on top of the previously known two dimensional information on the position and the pen pressure.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A position pointing mechanism for use with a position detecting apparatus, comprising:

a generally cylindrical pen-shaped position pointing device manipulable with one hand of a person operating the mechanism, the pointing device having a housing, a forward end and a rearward end, a rotatable dial having a periphery exposed through the housing and moveable through an arc along the axis of the position pointing device, the rotatable dial having an axis perpendicular to the axis of the position pointing device, the dial being located on the pen shaped position pointing device at a position closer to the forward end than the rearward end of the pointing device so as to be operable with a finger of the one hand in which the position pointing device is held, means for detecting rotation of the dial, and means for detecting relative pressure between the position pointing device and the position detecting apparatus, said means for detecting relative pressure located at the forward end of the pointing device.

2. The position pointing mechanism of claim 1, wherein the means for detecting rotation comprises a variable capacitor.

3. The position pointing mechanism of claim 1, wherein the means for detecting rotation comprises a variable resistor.

4. The position pointing mechanism of claim 1, wherein the means for detecting rotation comprises an absolute rotary encoder.

5. The position pointing mechanism of claim 1 wherein the dial returns to a predetermined position when not in use.

6. The position pointing mechanism of claim 2 wherein the dial returns to a predetermined position when not in use.

7. The position pointing mechanism of claim 3 wherein the dial returns to a predetermined position when not in use.

8. The position pointing mechanism of claim 4 wherein the dial returns to a predetermined position when not in use.

9. The position pointing mechanism of claim 1, further comprising a plurality of switches presented on an exterior surface of the pen shaped positioning pointing device and means for detecting an activation of the plurality of switches.

10. A method for inputting data to a computer using a position pointing device and a tablet, the method comprising the steps of:

holding the position pointing device in one hand;

contacting the position pointing device with the tablet;

moving the position pointing device in contact with the tablet relative to the tablet to input a first set of data;

measuring the relative pressure between the position pointing device and the tablet to input a second set of data; and rotating a dial on the position pointing device with a finger of the one hand to input a third set of data.

11. The method as claimed in claim 10, further comprising the step of activating a switch on the position pointing device with a finger of the one hand to input a fourth set of data.

* * * * *